United States Patent [19]

Courtright

[11] 4,260,109
[45] Apr. 7, 1981

[54] REEL TRANSPORT ALIGNMENT SYSTEM

[75] Inventor: Burr Courtright, La Grande, Oreg.

[73] Assignee: CH₂O, Inc., La Grande, Oreg.

[21] Appl. No.: 9,143

[22] Filed: Feb. 5, 1979

[51] Int. Cl.³ .............................................. B05B 3/00
[52] U.S. Cl. .................................. 239/189; 239/191; 239/720
[58] Field of Search .............. 239/212, 184, 186, 189, 239/191; 137/344; 242/47.01

[56] References Cited

U.S. PATENT DOCUMENTS

| 2,941,727 | 6/1960 | Zybach | 239/177 |
| 3,444,941 | 5/1969 | Purtell | 137/344 |
| 3,484,046 | 12/1969 | Harris | 137/344 |
| 3,771,720 | 11/1973 | Courtright | 239/189 |
| 3,811,617 | 5/1974 | Cornelius | 239/212 |
| 3,843,058 | 10/1974 | Koinzon | 239/212 |
| 3,848,625 | 11/1974 | Courtright | 137/344 |
| 3,980,098 | 9/1976 | Courtright | 239/212 |
| 4,142,547 | 3/1979 | Courtright | 239/184 |
| 4,151,858 | 5/1979 | Courtright | 239/184 |
| 4,172,556 | 10/1979 | Standal | 137/344 |
| 4,184,639 | 1/1980 | Miller | 239/212 |

FOREIGN PATENT DOCUMENTS 217436 5/1958 Australia .................................. 239/177

Primary Examiner—Martin P. Schwadron
Assistant Examiner—A. Michael Chambers
Attorney, Agent, or Firm—M. Ralph Shaffer

[57] ABSTRACT

A reel transport alignment system wherein movable structure carries a reel such as a winch or a capstan, either of which is provided with a flexible elongate member such as a cable that is to be maintained and anchored at a fixed point spaced from the movable structure. The reel, e.g. winch or capstan, as the case may be, is revolved so that the primary structure advances toward the anchor point of the cable by the reel wrapping or winding up the cable in such a manner that the primary structure advances forwardly. Means are provided which cooperates with the cable and senses any askew orientation thereof relative to the instantaneous orientation and direction of movement of the primary support structure so that there is set in motion a function or series of functions whereby the primary structure is realigned so that its general orientation and direction of travel is essentially rectilinear with the cable. In this way, the deviations of the instantaneous orientation of the primary structure carrying the reel, be it capstan or winch, are automatically corrected by the automatic sensing device, cooperable with the cable, being used to control a valve or other control element for correcting the direction of travel of the primary structure so that it moves in a desired direction, i.e., advances along the cable in a straight line toward the cable's anchor point.

11 Claims, 7 Drawing Figures

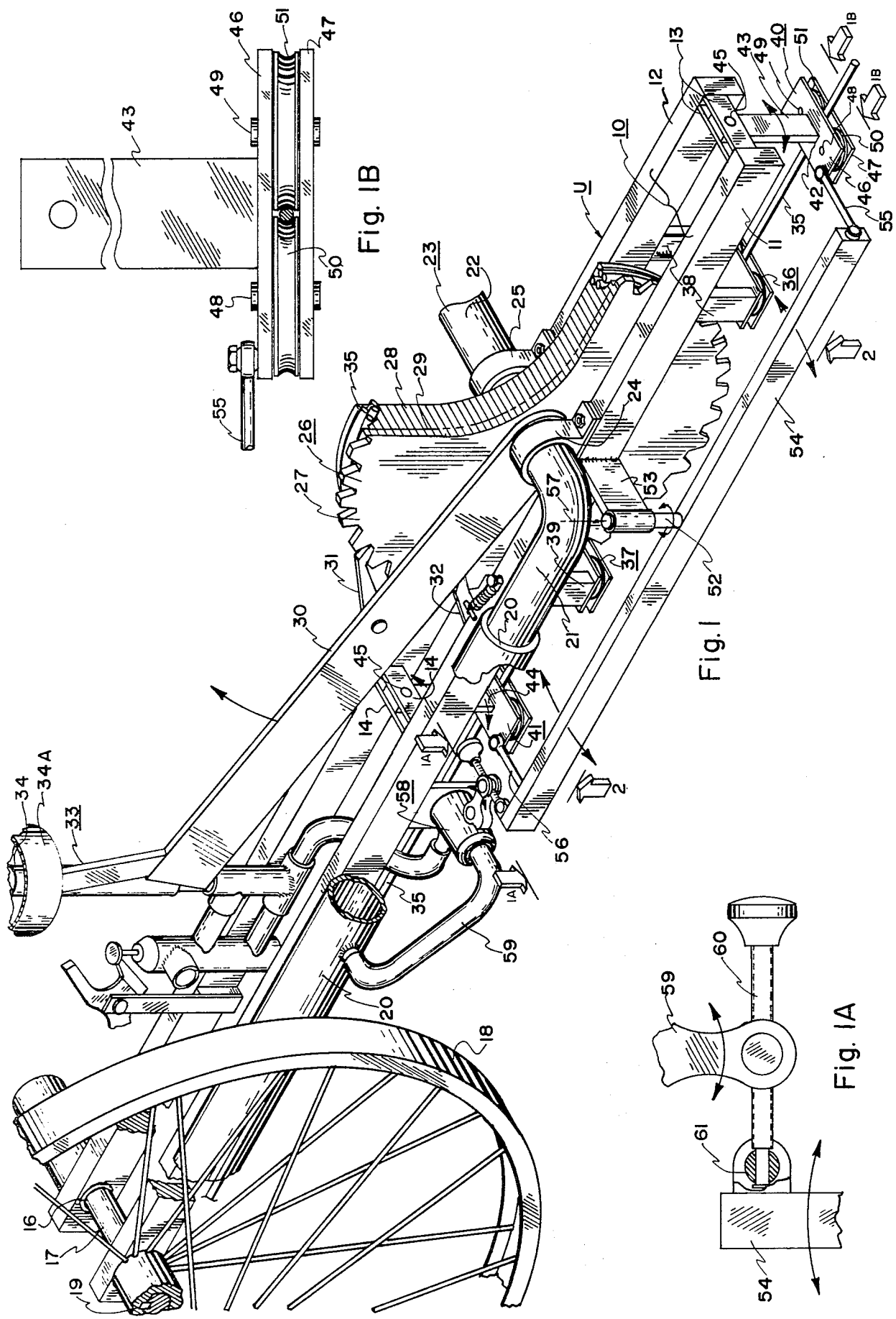

REEL TRANSPORT ALIGNMENT SYSTEM

FIELD OF INVENTION

The present invention relates to transportable structures incorporating reels of one type or another, i.e., winch or capstan, by way of example, whereby the primary transport structure in its travel is kept in alignment with the direction of orientation of its cable. More particularly, in one form of the invention, the transport structure comprises a unit operably associated with an agricultural irrigation wheel line, such unit incorporating a guide cable and also additional structure, by way of example, which senses the relative directions of the cable and unit so that the unit can be speeded up and slowed down or stopped, for example, whereby the wheel line can preserve its integrity so far as rectilinear orientation is concerned during operation thereof.

DESCRIPTION OF PRIOR ART

In the broadest context of the invention, no prior art is known that teaches a mechanical sensing of a guide cable, anchored to a forward fixed point, whereby any askew or non-aligned disposition of a carrier structure traveling along the cable can be adjusted as to its orientation to insure that such carrier or primary structure advances in rectilinear relationship, essentially, with the cable.

Heretofore there have been a number of devices, both using reciprocating hydraulic jacks as well as other structure, for powering an agricultural unit across a field, and this where an anchored guide cable is used for either guiding the unit forwardly toward the fixed anchor point of the cable and/or actually driving the unit where a capstan is used and the capstan is power-revolved. See in this connection the following patents and patent applications, by way of example (U.S.):

| Title | Serial Number | Filed |
| --- | --- | --- |
| POWER ASSIST STRUCTURE WATER PROPELLED PRIME MOVER, ETC. | 3,980,098 (Pat.) | |
| | 729,994 | 10/6/76 |
| AGRICULTURAL IRRIGATION SYSTEM, ETC. | 738,044 | 11/2/76 |
| IRRIGATION SYSTEM ETC. | 738,045 | 11/2/76 |
| Other Patents: | 3,484,046 | 4,006,860 |
| | 3,848,625 | 3,444,941 |
| | 2,941,727 | |
| | 217,436 (Australia) | |

None of the above patents, however, teach the concept or suggest structure by which any temporary askew disposition of the primary structure or carrier can be automatically corrected so that the primary structure advances "on line", that is, directly on course in accordance with the intended, pre-set disposition of the cable. If the orientation of the carrier is askew relative to the general direction of the cable, then the cable drum may tend to malfunction; additionally, the unit will not be traveling on its intended course. Particularly is there a problem here wherein the unit is an integral part or forms an attachment to an agricultural wheel line having an elongate central conduit which in composite length may reach even one-fourth of a mile in dimension. Here, the unit, should the same be swivel-coupled to an end of the wheel line, may become askew through an actual bending of the line either forwardly or rearwardly in a horitontal plane, relative to ground conditions over which the line is traveling. It is, of course, imperative that the wheel line be kept rectilinear so that none of the sections lead or lag. A certain prior U.S. patent application Ser. No. 738,044 teaches the incorporation of booster units for correcting any misalignments that occur in intermediate lengths of the wheel line. A separate problem is presented, however, where the unit incorporating the capstan is end-mounted and where, for example, that end of the line either leads or lags the remainder of the wheel line. In such event the drive capstan has to be either speeded up or slowed down in its revolvement so that the capstan unit can either catch up to or slow down to the rectilinear relationship intended as to that portion of the wheel line and the remainder of the same.

BRIEF DESCRIPTION OF THE INVENTION

According to the present invention, structures such as a primary structure, prime mover, power unit, etc., incorporates a reel, which is a winch or winch drum or even a capstan, whereby the flexible elongate connector, such as a cable, normally associated with a winch drum or capstan is stretched over a length of field to be irrigated, with the furthermost extremities of the cable being anchored to a fixed point. The unit or structure will be initially aligned transversely in a normal, angular relationship relative to the cable and, will be intended for travel longitudinally in a direction rectilinear with that of the top cable. Whether a winch drum or a capstan is used, and a capstan is preferred, the capstan will be intended, of course, to have an revolvement axis that is at all times normal to the cable in its stretched top condition. Because of torsional lag of a wheel line, where used, or angulations in ground terrain, or for other reasons, the primary structure or carrier may arrive at a condition where the same is not aligned with a cable. This is to say, the unit will be oriented in an askew manner such that the capstan cable, where a capstan is used, will tend to dog-leg. The present invention supplies means cooperable with the cable directly whereby a deviation from the correct relative position of the cable and the primary unit or carrier structure will be sensed, and such sensing will be automatically operative to produce a change in the orientation of the carrier so that the same again advances along the cable. Where the invention is used in conjunction with agricultural wheel lines, the capstan will be simply speeded up or slowed down so that the unit may assume again its correct orientation relative to the rest of the wheel line.

In a preferred form of the invention there is a swinging arm that swings in a horizontal plane and is pivoted vertically underneath the unit, with ends of such swinging arm receiving the cable. When the arm shifts angularly in a horizontal plane, essentially, then such a shift will be sensed by a valve that is linked to or otherwise cooperable with the swinging arm. The control element of the valve may be used to control fluid-flow through a hydraulic jack, for example, that can be used to power the capstan.

It will of course be understood that there are many types of controls, hydraulic, electrical, mechanical, and so forth that can be used to sense deviation of the capstan or winch cable relatively speaking, when compared with the orientation of the primary structure. More properly, it is the primary structure and its orientation and direction of travel that are sensed, relative to anchored cable direction, whereby, in some appropriate manner, the orientation of the primary structure can be corrected so that the desired rectilinear relationship is between primary structure or vehicle travel and the cable can again be maintained.

OBJECTS

Accordingly, a principal object of the present invention is to provide a new and improved reel transport alignment system.

A further object is to provide a system wherein primary structure incorporating a reel and cable, is provided with means, either incorporated in or exterior to the structure itself whereby a direction of orientation of the primary structure relative to the cable can be sensed and any deviation used to actuate control means for realigning a primary structure to the direction of the cable.

A further object is to provide for correction of agricultural wheel line deflection, this by an entirely new system of incorporating a capstan cable and sensing relative deflection of the cable from its true condition for actuating means to reorient the travel of the primary unit whereby the same may again move in alignment with the cable and, by so doing, come again in essential alignment with the remainder of the wheel line.

A further object is to provide a new and improved agricultural wheel line system and components therein.

An additional object is to provide, for an agricultural wheel line, a reel provided structure that incorporates cable sensing means automatically responsive to cable deflection relative to the direction of travel of the primary structure of the unit incorporating the reel for moving the primary structure appropriately to bring it in line as to its orientation and direction of travel with the cable and also in line with the wheel line structure with which the unit is associated.

A further object is to provide for structure incorporating a reel and cable of any type, whereby the temporary askew orientation of the primary structure relative to the cable can be adjusted so that the primary structure is again brought into alignment with such cable.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF DRAWINGS

FIG. 1 is a fragmentary perspective view of the invention in one form thereof.

FIG. 1A is an enlarged fragmentary plan taken along the arrows 1A—1A in FIG. 1.

FIG. 1B is an enlarged elevation of a portion of the structure and is taken along the arrows 1B—1B in FIG. 1.

In FIG. 1 movable support structure 10 is shown to include a pair of beams 11 and 12 that are provided with a series of cross braces 13 disposed therebetween and welded or otherwise secured thereto. Similarly, cross braces 14 are likewise supplied for the same purposes, and with as many additional cross braces as may be necessary or needed. To the rear of beams 11 and 12 are journal bearings 16, one being shown, which is provided for wheel shaft 17, accommodating one or more wheels 18 that are keyed to the shaft as at 19. Conduit 20 is connected to the hose which is dragged over the field, conduit 20 being provided with an elbow at 21 (see FIG. 1) that is slip-coupled to a side-extending wheel line shaft or central conduit 22 of wheel line 23. The central conduit 22 is carried by support structure 10 by the inclusion of suitable bearing mounts 24 and 25. Freely mounted to and revolvable about the central conduit, or a stub section connected thereto, is structure 26 which, in its composite form, may comprise a ratchet wheel or gear 27 and also a capstan 28. The two may be separate parts welded together as is shown by phantom line 29 (of FIG. 1), or the two may be simply a single cast or machined unit as is shown by the section line. Likewise freely mounted upon the central conduit or side shaft 22 is one end of a lever arm 30, this by a provision of a suitable end aperture (not shown); the lever arm is provided with the usual spring loaded pawl 31. Main frame or support structure 10, itself, is likewise provided with a spring-loaded pawl 32. Lever arm 30 forms part of a hydraulic jack structure 33 which is shown and fully described in the following United States patent applications and patent, which are fully incorporated herein by way of reference:

Figures 2, 2A, 2B:
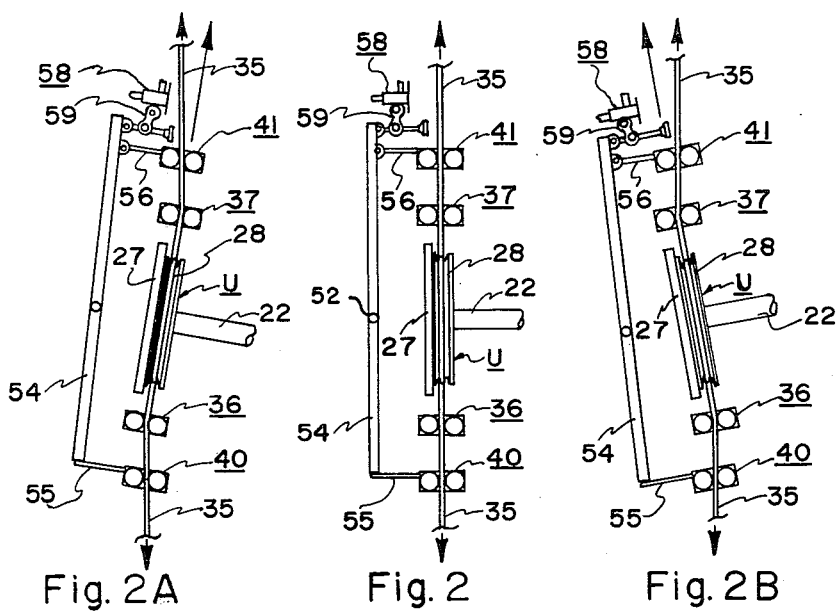
FIG. 2 is a bottom plan in reduced scale, taken along the arrows 2—2 in FIG. 1, of a portion of the structure.
FIGS. 2A and 2B are also bottom plans in reduced scale, similar to FIG. 2, but illustrate the configuration of the guide cable when the support structure is oriented in an askew manner relative to the cable, i.e., displaced either angularly to the right or to the left.

| | |
|---|---|
| 729,994 | 738,045 (Pat. No. 4,142,547) |
| 738,044 (Pat. No. 4,151,858) | 3,980,098 (Pat.) |

Reciprocating hydraulic jacks such as jack 33 are well known in the art and need no further discussion. Suffice it to say that as the cylinder 34A reciprocates up and down along its piston rod 34, the lever 30 is rotationally displaced in a reciprocating manner such that the pawl 31 progressively advances sequentially of the gear 27 and hence of reel or capstan 28. Flexible elongate member 35 may comprise a cable, by way of example, which is anchored at opposite extremities to opposite points in a field to be irrigated. Several wraps of the flexible elongate connector, member, or cable 35 wil be disposed or wound about the capstan and proceed through or in a threaded manner extend between guided wheels or sheaves 36 and 37 (see FIGS. 2, 2A and 2B) that are anchored by posts 38 and 39 (FIG. 1) to the framework of support structure 10. Movable sheaves or sheave members 40 and 41 are welded or otherwise secured at 42 to their respective swing or pivot arms 43 and 44, the same being pivoted by pivot pins 45 to the respective braces 13, 14, etc. The pivot arms 43 and 44 will be sufficiently long such that but a slight pivotal displacement about the respective pivot pins 45 will produce a horizontal shifting of the respective sheaves back and forth without appreciable vertical lifting. Cable 35 is routed or threaded between each pair of the sheaves as shown, and the sheaves or sheave members will of course comprise a pair of plates 46 and 47 secured together by pivot pins 48 and 49 and interior pulleys 50 and 51. All of the sheaves may be similarly constructed.

A post 52 is pivotally secured in bracket 53, the latter being welded to support structure 10 as indicated. Thus, the swingably movable pivot arm 54 attached to pivot pin 52 moves horizontally back and forth in a horizontal plane and is simply vertically suspended from bracket 53. Links 55 and 56 are articulatively, e.g. spherically secured at their opposite extremities or otherwise linked to the sheaves 40 and 41. Thus, when the pivot arm pivots about its horizontal axis 57, the same will be caused by the pivoting of pivot arms 43 and 44 as will be the case by dogleg configurations of cable 35 in the event that the unit is misaligned relative to the intended direction of travel as outlined by cable extremities.

A control valve 58 is coupled between hydraulic or motor drive jack unit 33 and conduit 59 that leads to conduit 20. Accordingly, the water supplied by the inlet hose, not shown, will first proceed through the valve 58 and from the same into the hydraulic jack unit. The valve 58 itself includes an arm 59 (see also FIG. 1A) that is pivotal back and forth and is secured to adjustment screw 60, the latter being pivoted in place by pin 61 to movable arm 54. The hose that is dragged along the ground supplies water not only to the hydraulic jack, by valve 58, but also supplies water through the elbow 21 to the side conduit 22 of wheel line 23, thereby pressurizing the wheel line to provide irrigation water at the sprinklers thereof. Wheel line 23 is thus shown to include one of several sprinklers 54 (see FIG. 3) of common type, the central conduit 22 of wheel line 23 being provided with the usual keyed wheels 55a.

Figure 3:
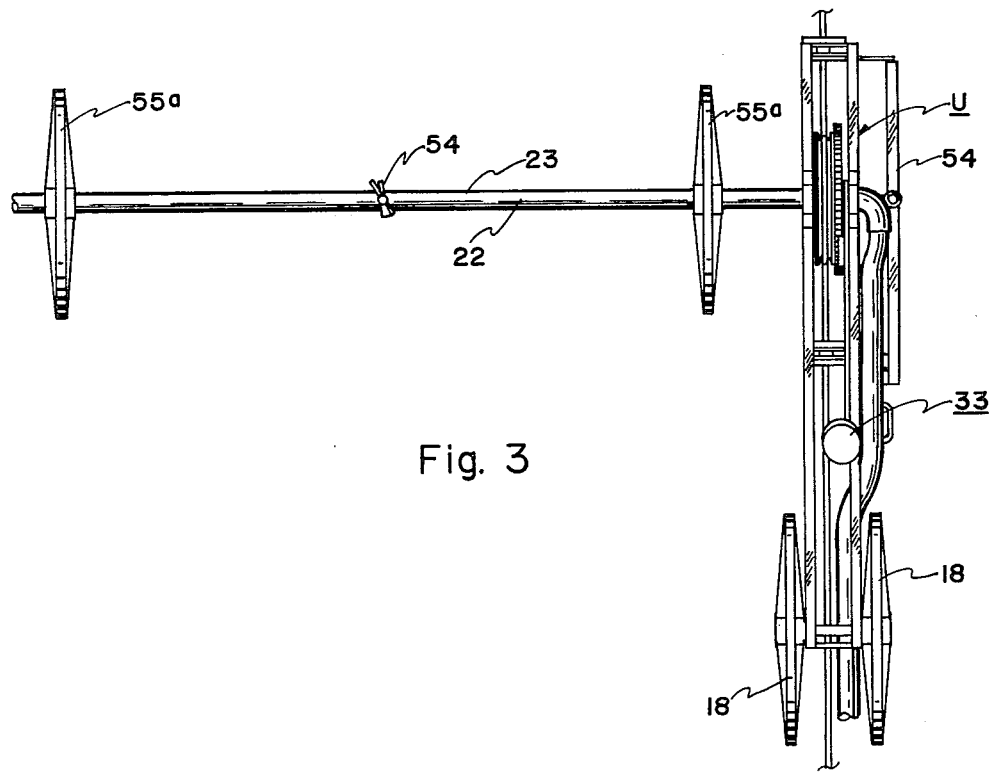
FIG. 3 is a top plan in reduced scale, shown in fragmentary view, of an agricultural irrigation wheel line, the unit of FIG. 1 of the present invention being end-coupled thereto.

In operation the wheel line will be advanced forwardly by spaced booster units such as that shown in U.S. patent application Ser. No. 738,044 (supra). Accordingly, the wheel line 23 in FIG. 3 is driven and the unit supplied provides water to the wheel line and also a suitable adjustment mechanism for the unit in the event that the end of the wheel line coupled to the unit U leads or lags the rest of the line.

Accordingly, FIG. 2 illustrates the usual condition wherein the line is rectilinear and the unit is proceeding in a direction the same as the cable upon which the unit is advancing.

It is to be remembered now that FIGS. 2A and 2B are bottom views of portions of the equipment. Thus, in the event that the unit U becomes askew relative to the direction of the anchored cable or flexible elongate member or connector, then the condition of FIG. 2A may well occur, in which event the movable arm at 54 will be displaced pivotally about axis 57 of pin 52. In such event, and owing to the displacement of the arm, the valve will be actuated to either speed or slow down the unit such that the end of the wheel line nearest the unit U defined by longitudinal main frame or support structure 10 will come again in line with the intended direction of travel of the unit, that is in the direction of the anchored cable.

FIGS. 2A and 2B illustrate opposite configurements for opposite displacements, FIG. 2A where the unit is lagging the rest of the wheel line and FIG. 2B where the unit is leading the rest of the wheel line.

While the unit has been described herein in a preferred embodiment as an agricultural unit, it will be understood that the same principles apply to other types of units for simply controlling the motion of a reel-carrying unit, relative to a taut cable, be the cable a winch cable anchored at one end or a capstan cable anchored at opposite ends.

Sheaves 36 and 37 keep the cable from catspawing on the capstan and hence are an appropriate inclusion.

Accordingly, what is provided is a new and useful system and apparatus which carries a reel of some type, i.e., winch or capstan, such that any deviations in orientation of the unit relative to an intended line of travel, as is marked out by a staked cable its in-position anchored, guide end portions, can be automatically corrected by a valve or other means and since the valve is actuated to speed up or slow down the hydraulic jack mechanism and thereby to speed up or slow down the speed of the capstan. Again, this will bring the unit carrying the capstan alignment with the remainder of the wheel line.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A unit for coaction with irrigation equipment for variably accelerating and decelerating a portion thereof so as to keep the irrigation equipment regularly operating, said unit including, in combination: support structure having ground-support means; a capstan carried by said ground structure; a flexible elongate connector wound upon said capstan and constructed for anchored extension therefrom at a remote point; means for revolvably driving said capstan; and control means coupled to said revolvably driving means, cooperating with and movably engaging said flexible elongate connector, and responsive to deviation between support structure travel orientation and flexible elongate connector orientation, for controlling said revolvably driving means to thereby reduce such deviation, said revolvably driving means comprising hydraulic jack means operatively coupled to said capstan, said control means comprising valve means provided said hydraulic jack means for controlling flow therethrough, and linkage receiving said flexible elongate connector and coupled to said valve means, and wherein and support structure has a vertically pivoted horizontally swinging arm having end connection means engaging said flexible elongate connector at at least one point spaced from said capstan, said linkage including said swinging arm, said valve means having a valve control element coupled to said swinging arm.

2. The structure of claim 1 wherein fixed means receives said flexible elongate connector between said swinging arm end connection and said capstan, whereby to insure proper winding of said capstan.

3. Apparatus according to claim 1, wherein said revolvably driving means also includes a gear operatively coupled to and between said capstan and said hydraulic jack means.

4. The combination of claim 1 wherein said capstan comprises a winch.

5. In an irrigation apparatus having a forwardly extending main frame and a side-extending conduit-carrying wheel line and wherein reel means is operatively carried on the main frame, flexible cable means is adapted to extend lengthwise in the direction of desired movement of the apparatus and to be endwise-anchored in position, and the cable means is to be wound on the reel means; the improvement of: motor means carried by the main frame for actuating the reel means to advance the main frame on the ground along the cable means, control means for controlling the operation of said motor means, operating means carried on the main frame adjacent the reel means and cooperating with the cable means and connected to said control means for varying the actuation of said motor means to automatically realign orientation of the main frame and the reel means with respect to an end portion of said cable means in response to angular deviation of the reel means and of an adjacent portion of the cable means with respect to such end portion said operating means has swing arm means operatively carried on, and pivotal with respect to the main frame along the reel means, has link means extending from said swing arm means, and has cable guided means carried by said link means, said swing arm means is adapted to cooperate with the cable means adjacent an end of the reel means to swingably follow angular deviation of an adjacent portion of the cable means that is engendered by ground movement deviation of the main frame and the reel means, and said control means is operatively connected to said suring arm means for compensating operation of said control means in response to angular deviation of the reel means.

6. An irrigation apparatus as defined in claim 5 in which, said motor means is liquid-actuated, said control means is a liquid flow-controlling valve, and liquid supply means is carried by the main frame and connected to said motor means through said valve.

7. An irrigation apparatus as defined in claim 6 in which means connects said liquid supply means to supply irrigating liquid to the wheel line independently of said valve.

8. An irrigation apparatus as defined in claim 5 in which, said motor means is a liquid-actuated hydraulic jack, said control means is a liquid flow-controlling valve, said liquid supply means is carried by the main frame and is connected through said valve to said hydraulic jack.

9. An irrigation apparatus as defined in claim 8 in which, said liquid supply means has means connecting it to supply irrigating liquid to the wheel line independently of said valve, and said control means is constructed to operate independently of deviations that may occur between portions along the wheel line during advancing movement of the main frame.

10. An irrigation apparatus as defined in claim 5 in which, said link means has a pair of links extending from said swing arm means adjacent opposite ends thereof, said cable guided means is adapted to follow the cable means adjacent opposite ends of said swing arm means, and said cable guided means is adapted to follow deviation of portions of the cable means that lie adjacent to the reel means when the main frame and the reel means have a drive deviation with respect to an end-anchored portion of the cable means.

11. In an irrigation apparatus having a forwardly extending main frame and a side-extending conduit-carrying wheel line and wherein, reel means is operatively carried on the main frame, flexible cable means is adapted to extend between two lengthwise separated points of end-positioned anchoring, and the cable means is wound on the reel means for movement of the reel means therealong; the improvement of: motor drive means carried by a main frame for actuating the reel means to progressively advance the main frame on the ground along the cable means, control means for controlling the speed of operation of said motor drive means, cable-guided swing means operatively carried on, and pivotal with respect to the main frame and adjacent the reel means for movement in response to angular deviation of a portion of the cable means that is effected by deviation of the reel means with respect to the end-positioned anchoring, and control means operatively connected to said swing means for controlling the operation of said motor means in such a manner as to automatically realign orientation of the reel means and the main frame with respect to the end-positioned anchoring of the cable means.

* * * * *